UNITED STATES PATENT OFFICE.

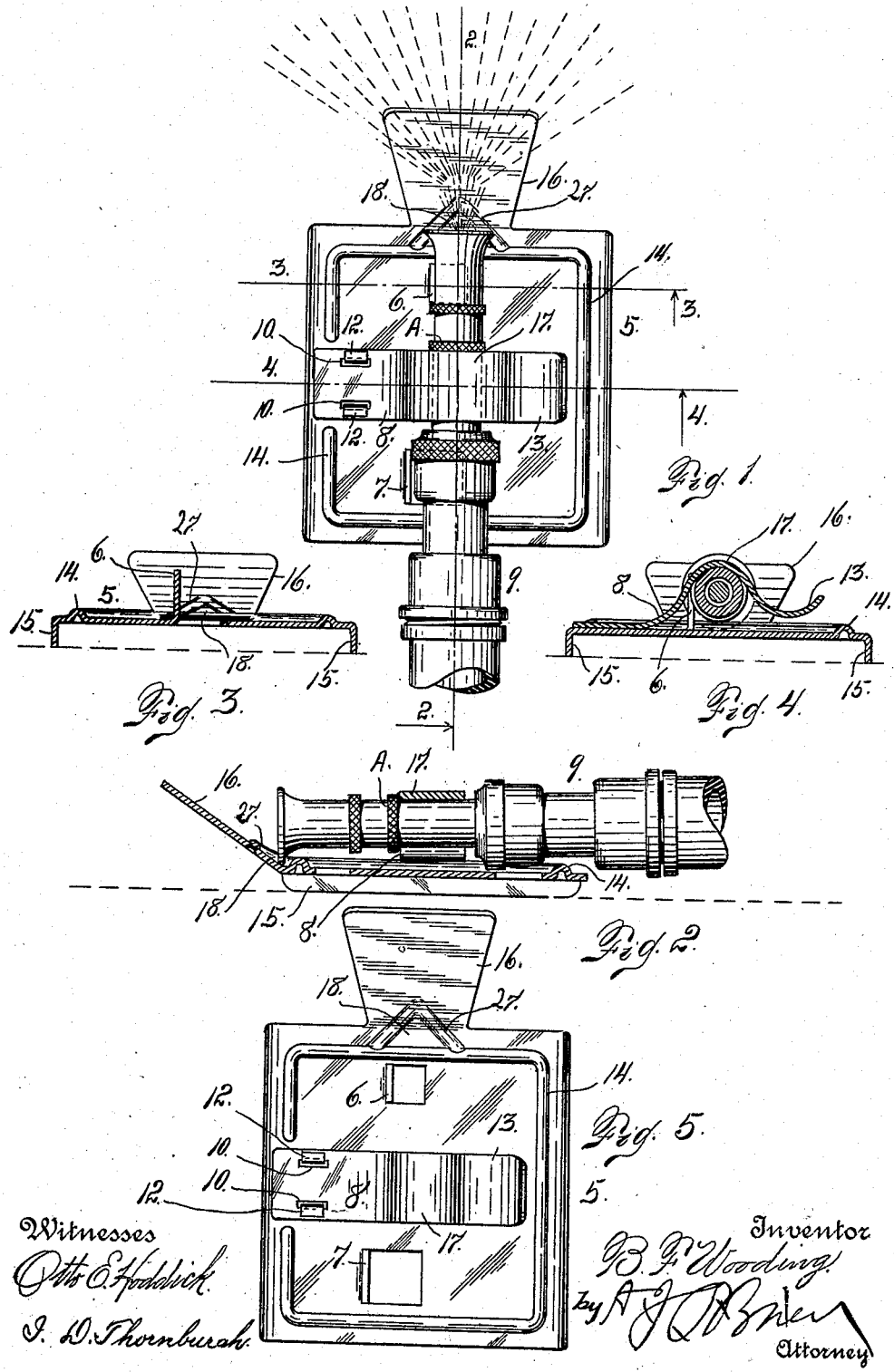

BENJAMIN F. WOODING, OF DENVER, COLORADO.

LAWN-SPRINKLER.

No. 924,519.     Specification of Letters Patent.     Patented June 8, 1909.

Application filed August 10, 1908. Serial No. 447,902.

*To all whom it may concern:*

Be it known that I, BENJAMIN F. WOOD-ING, a citizen of the United States, residing in the city and county of Denver and State of Colorado, have invented certain new and useful Improvements in Lawn-Sprinklers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in lawn sprinklers or spraying devices, my object being to provide a device of this character which shall be exceedingly simple in construction, economical in cost and which shall efficiently perform the lawn sprinkling or spraying function.

My improved construction comprises a plate having an upwardly inclined spraying part located at its forward extremity, the said plate being provided with means for clasping the nozzle of the hose, whereby the latter is retained upon the plate with its discharge extremity directed toward the inclined spraying portion of the device. The means for retaining the nozzle in position upon the plate may be considerably varied without departing from the spirit of the invention.

Having briefly outlined my improved construction, I will proceed to describe the same in detail, reference being made to the accompanying drawing, in which is illustrated an embodiment thereof.

In this drawing, Figure 1 is a top plan view of my improved spraying device with the hose nozzle in place. Fig. 2 is a section taken through the spraying device on the line 2—2, Fig. 1, the nozzle being shown in elevation. Fig. 3 is a section taken on the line 3—3, Fig. 1, viewed in the direction of the arrow. Fig. 4 is a section taken on the line 4—4, Fig. 1. Fig. 5 is a top plan view of the device shown in detail.

The same reference characters indicate the same parts in all the views.

Let the numeral 5 designate a plate, which, as shown in the drawing, is rectangular, preferably square or approximately so. Punched out of the plate are two upwardly directed lips 6 and 7, one being located near the forward extremity of the plate and the other near the rear thereof. These lips serve as stops to engage the nozzle in the front and rear of the retaining clasp 8, which is mounted on the plate between the lips 6 and 7. This clasp as shown in the drawing, is composed of spring metal and extends transversely of the plate, or in a transverse direction with reference to the nozzle 9, when the latter is in position. As shown in the drawing, the clasp is provided with two openings 10, through which securing lugs pass. These lugs or lips are formed by punching them out of the plate 5. After the clasp is passed over these upwardly directed lugs, the latter are bent downwardly upon the clasp, thus securing the latter in place. The extremity of the clasp opposite these securing lugs is free and normally occupies a position in close proximity to the upper surface of the plate. The nozzle may be passed under the clasp by pushing it laterally against the upwardly turned extremity 13 of the latter.

The lip 6 is located out of line with the lip 7, the two lips being arranged to harmonize with the different diameters of the nozzle. For instance, the forward extremity of the nozzle being considerably smaller than its rear portion, the lips 6 and 7 must be out of line in order to both engage the nozzle when the latter is in the proper position. These lips retain the nozzle in proper alinement and prevent it from getting out of the proper position upon the plate.

The plate is provided with a strengthening bead 14, located near its outer edge, the same being formed by pressing the metal of the plate upwardly, whereby a groove is formed below the bead. The opposite side edges of the plate are also parallel with the nozzle when in position, and are turned downwardly, as shown at 15, forming runners for the plate. These runners engage the ground and facilitate the movement of the plate from place to place by pulling upon the hose.

The spraying feature of the device, as shown in the drawing, consists of a forwardly directed and upwardly inclined member 16 connected with the forward extremity of the plate, as shown in the drawing, formed integral therewith. The forward extremity of the plate 5 and the lower part of the spraying member 16, are provided with a rib 27, which is connected with the main rib 14, forming a triangular recess 18 which is engaged by the forward extremity of the nozzle. This recess retains the hose nozzle in its proper relative position upon the device and prevents it from slipping either laterally or longitudinally, when the device is moved from place to place by pulling upon the hose or otherwise.

When the device is in use, the nozzle is placed in position, as shown in Figs. 1 and 2, by pressing it against the upwardly turned extremity 13 of the clasp 8, causing the clasp to spring upwardly until the nozzle passes under the central upwardly curved part 17 of the clasp. At the same time the nozzle is brought against the lips 6 and 7 of the plate. In this event a collar A upon the nozzle, occupies a position just in front of the clasp, thus preventing the nozzle from sliding rearwardly upon the plate. In this event the forward or discharge extremity of the nozzle occupies a position immediately in front of the inclined spraying member 16. As the water issues from the discharge extremity of the nozzle, it strikes upon the spraying member 16, which causes it to spread, forming a spray of suitable character for lawn sprinkling purposes.

As heretofore intimated, the construction or device may be varied within the scope of the appended claims.

Having thus described my invention what I claim is:

1. A spraying device for garden hose, comprising a base plate having a forwardly directed upwardly inclined spraying feature, a nozzle-retaining leaf spring clasp engaging the plate at one extremity and provided with openings, the plate having integral lugs struck upwardly therefrom and engaging the openings in the clasp to retain the latter in place, the opposite side edges of the base plate being turned downwardly to form runners, substantially as described.

2. A spraying device of the character described, comprising a base plate having a forwardly directed upwardly inclined member for spraying purposes, a nozzle-retaining leaf spring clasp engaging the plate at one extremity and provided with an opening, the plate having an integral retaining lug struck upwardly therefrom and engaging the opening in the clasp, the latter extending in a direction transversely of the nozzle when the latter is in place, one extremity of the clasp being free to allow the nozzle to pass under the same, substantially as described.

3. A spraying device for garden hose, comprising a plate having a forwardly directed upwardly inclined spraying feature, downwardly turned opposite side edges, a transversely arranged nozzle-retaining clasp and upwardly directed lips for engaging the nozzle in the front and the rear of the clasp, substantially as described.

4. A spraying device for garden hose, comprising a plate having a forwardly directed upwardly inclined spraying member, the body of the plate being equipped with nozzle retaining means, the forward extremity of the plate and the lower part of the spraying member being provided with a recess adapted to receive the discharge extremity of the nozzle for the purpose set forth.

In testimony whereof I affix my signature in presence of two witnesses.

BENJAMIN F. WOODING.

Witnesses:
 DAISY F. HUGHES,
 ALODIA HUTCHISON.